United States Patent
Te et al.

(10) Patent No.: US 9,017,811 B2
(45) Date of Patent: Apr. 28, 2015

(54) SILICA DOPED ALUMINOUS PARTICULATE MATERIALS

(75) Inventors: Mure Te, Waltham, MA (US); Doruk O. Yener, Wilmington, MA (US)

(73) Assignee: Saint-Gobain Ceramics & Plastics, Inc., Worchester, MA (US)

( * ) Notice: Subject to any disclaimer, the term of this patent is extended or adjusted under 35 U.S.C. 154(b) by 147 days.

(21) Appl. No.: 13/536,754

(22) Filed: Jun. 28, 2012

(65) Prior Publication Data

US 2013/0011678 A1    Jan. 10, 2013

Related U.S. Application Data

(60) Provisional application No. 61/502,667, filed on Jun. 29, 2011.

(51) Int. Cl.
*C01F 7/02* (2006.01)
*C01F 7/44* (2006.01)
(Continued)

(52) U.S. Cl.
CPC . *C01F 7/02* (2013.01); *C01F 7/025* (2013.01); *C01F 7/448* (2013.01); *C01P 2002/54* (2013.01); *C01P 2002/60* (2013.01); *C01P 2004/03* (2013.01); *C01P 2004/04* (2013.01); *C01P 2004/10* (2013.01); *C01P 2004/30* (2013.01); *C01P 2004/54* (2013.01); *C01P 2004/61* (2013.01); *C01P 2004/64* (2013.01); *C01P 2006/12* (2013.01); *C01P 2006/14* (2013.01); *C01P 2006/16* (2013.01); *C01P 2006/17* (2013.01); *C01P 2006/90* (2013.01); *B01J 37/10* (2013.01); *B01J 35/0006* (2013.01); *B01J 21/12* (2013.01); *B01J 35/002* (2013.01);

(Continued)

(58) Field of Classification Search
CPC ............ C01F 7/02; C01F 7/448; C01F 7/025; B01J 37/10; B01J 35/006; B01J 35/1019; B01J 35/1042; B01J 35/1047
USPC ........... 502/355, 414, 415; 106/483; 977/900; 423/626
See application file for complete search history.

(56) References Cited

U.S. PATENT DOCUMENTS 4,499,203 A * 2/1985 Toulhoat et al. ............... 502/247
5,055,443 A * 10/1991 Mercier et al. ................ 423/628
(Continued)

FOREIGN PATENT DOCUMENTS

| CN | 101061068 A | 10/2007 |
|---|---|---|
| CN | 101456569 A | 6/2009 |
| EP | 0227168 A2 | 7/1987 |

OTHER PUBLICATIONS

X. Bokhimi, J.A., et al. "Relationship Between Crystallite Size and Bond Lengths in Boehmite," J. Solid State Chemistry 159 (2001) 32-40.

(Continued)

*Primary Examiner* — Jeremy R Pierce
(74) *Attorney, Agent, or Firm* — Abel Law Group, LLP; Adam Keser

(57) ABSTRACT

A particulate material includes an aluminous material and a silica dopant. The particulate material includes crystallite particles with a crystallite particle size of less than about 10 nm. The crystallite particles are stacked together to form primary particles with a primary particle size of less than about 500 nm. The primary particles are agglomerated together to form secondary particles with a secondary particle size of greater than about 1 μm. The particulate material has a mean pore diameter of not less than 8 nm.

19 Claims, 4 Drawing Sheets

(51) Int. Cl.
    *B01J 37/10*    (2006.01)
    *B01J 35/00*    (2006.01)
    *B01J 35/02*    (2006.01)
    *B01J 35/08*    (2006.01)
    *B01J 35/10*    (2006.01)
    *B01J 37/00*    (2006.01)
    *B82Y 30/00*    (2011.01)
    *B01J 20/283*    (2006.01)
    *B01J 20/284*    (2006.01)
    *B01J 20/28*    (2006.01)
    *B01J 20/08*    (2006.01)
    *B01J 20/30*    (2006.01)
    *B01J 20/10*    (2006.01)
    *B01J 21/12*    (2006.01)

(52) U.S. Cl.
    CPC ............ *B01J 35/006* (2013.01); *B01J 35/023* (2013.01); *B01J 35/026* (2013.01); *B01J 35/08* (2013.01); *B01J 35/1019* (2013.01); *B01J 35/1042* (2013.01); *B01J 35/1047* (2013.01); *B01J 35/1061* (2013.01); *B01J 37/0036* (2013.01); *B82Y 30/00* (2013.01); *B01J 20/283* (2013.01); *B01J 20/284* (2013.01); *B01J 20/28004* (2013.01); *B01J 20/08* (2013.01); *B01J 20/28069* (2013.01); *B01J 20/3078* (2013.01); *B01J 20/3085* (2013.01); *B01J 20/28057* (2013.01); *B01J 20/103* (2013.01); *B01J 20/28016* (2013.01)

(56) References Cited

U.S. PATENT DOCUMENTS

| | | | | |
|---|---|---|---|---|
| 5,244,648 | A | * | 9/1993 | Dupin et al. ................... 423/626 |
| 5,728,184 | A | | 3/1998 | Monroe |
| 6,048,577 | A | | 4/2000 | Garg |
| 6,403,526 | B1 | | 6/2002 | Lussier et al. |
| 6,436,280 | B1 | * | 8/2002 | Harle et al. ................ 208/216 R |
| 7,208,446 | B2 | | 4/2007 | Stamires et al. |
| 7,244,689 | B2 | | 7/2007 | Addiego et al. |
| 7,422,730 | B2 | * | 9/2008 | Wang ............................ 423/111 |
| 7,638,105 | B2 | * | 12/2009 | Wang ............................ 423/111 |

OTHER PUBLICATIONS

Marquez-Alvarex, Carlos, et al., "Synthesis, characterization and Catalytic Applictaions of Organized Mesoporous Aluminas," Catalysis reviews, 50 (2) (2008) 222-286.

Dillon, Shen J., et al., "Relating Grain Boundary complexion to Grain boundary Kinetics II: Silica-Doped Alumina," J. Am. Ceram. soc., 91 (7) 2314-2320 (2008).

International Search Report for PCT/US2012/044699 dated Jan. 24, 2013, 2 pages.

* cited by examiner

SILICA DOPED ALUMINOUS PARTICULATE MATERIALS

CROSS-REFERENCE TO RELATED APPLICATION

The present application claims priority from U.S. Provisional Patent Application No. 61/502,667, filed Jun. 29, 2011, entitled "SILICA DOPED ALUMINOUS PARTICULATE MATERIALS," naming inventors Mure Te and Doruk O. Yener, which application is incorporated by reference herein in its entirety.

FIELD OF THE DISCLOSURE

The present disclosure generally relates to particulate materials and processes for forming same. More specifically, the present invention relates to particulate materials that include an aluminous material and a silica dopant.

BACKGROUND

Aluminous particulate material finds particular application as a desirable raw material for forming aluminous products, for example, alumina abrasive grains having high performance characteristics. Beyond abrasive applications, there is a particular desirability for creating aluminous particulate material having varying morphology. Since particulate morphology can have a profound impact upon the applications of the material, a need has arisen in the art for creation of new materials for applications beyond abrasives, including fillers utilized in specialty coating products and various polymer products and in forming high porosity support materials for use with catalysts. Other applications include those in which the aluminous particulate material is utilized in its as-formed state, rather than as a feedstock material. In addition to the interest in creating new materials, processing technology enabling the formation of such materials needs to be developed as well. In this regard, such processing technology is desirably cost effective, is relatively straightforward to control, and provides high yields.

SUMMARY

In a particular embodiment, a particulate material is disclosed that includes an aluminous material and a silica dopant. The particulate material includes crystallite particles with a crystallite particle size of less than about 10 nm. The crystallite particles are stacked together to form primary particles with a primary particle size of less than about 500 nm. The primary particles are agglomerated together to form secondary particles with a secondary particle size of greater than about 1 µm. The particulate material has a mean pore diameter of not less than 8 nm.

In another embodiment, a particulate material that includes an aluminous material and the silica dopant is disclosed. The particulate material is formed by a process that includes providing a precursor material, seeds, and a silica dopant in a suspension and that includes hydrothermal treating of the suspension. The particulate material includes crystallite particles with a crystallite particle size of less than about 10 nm. The crystallite particles are stacked together to form primary particles with a primary particle size of less than about 500 nm. The primary particles are agglomerated together to form secondary particles with a secondary particle size of greater than about 1 µm. The particulate material has a mean pore diameter of not less than 8 nm.

In another embodiment, a method is disclosed that includes providing a precursor material, seeds, and a silica dopant in a suspension. The method includes hydrothermal treating of the suspension to form a particulate material that includes an aluminous material and the silica dopant. The particulate material includes crystallite particles with a crystallite particle size of less than about 10 nm. The crystallite particles are stacked together to form primary particles with a primary particle size of less than about 500 nm. The primary particles are agglomerated together to form secondary particles with a secondary particle size of greater than about 1 µm. The particulate material has a mean pore diameter of not less than 8 nm.

BRIEF DESCRIPTION OF THE DRAWINGS

The present disclosure may be better understood, and its numerous objects, features, and advantages made apparent to those skilled in the art by referencing the accompanying drawings.

DETAILED DESCRIPTION

Figure 1:
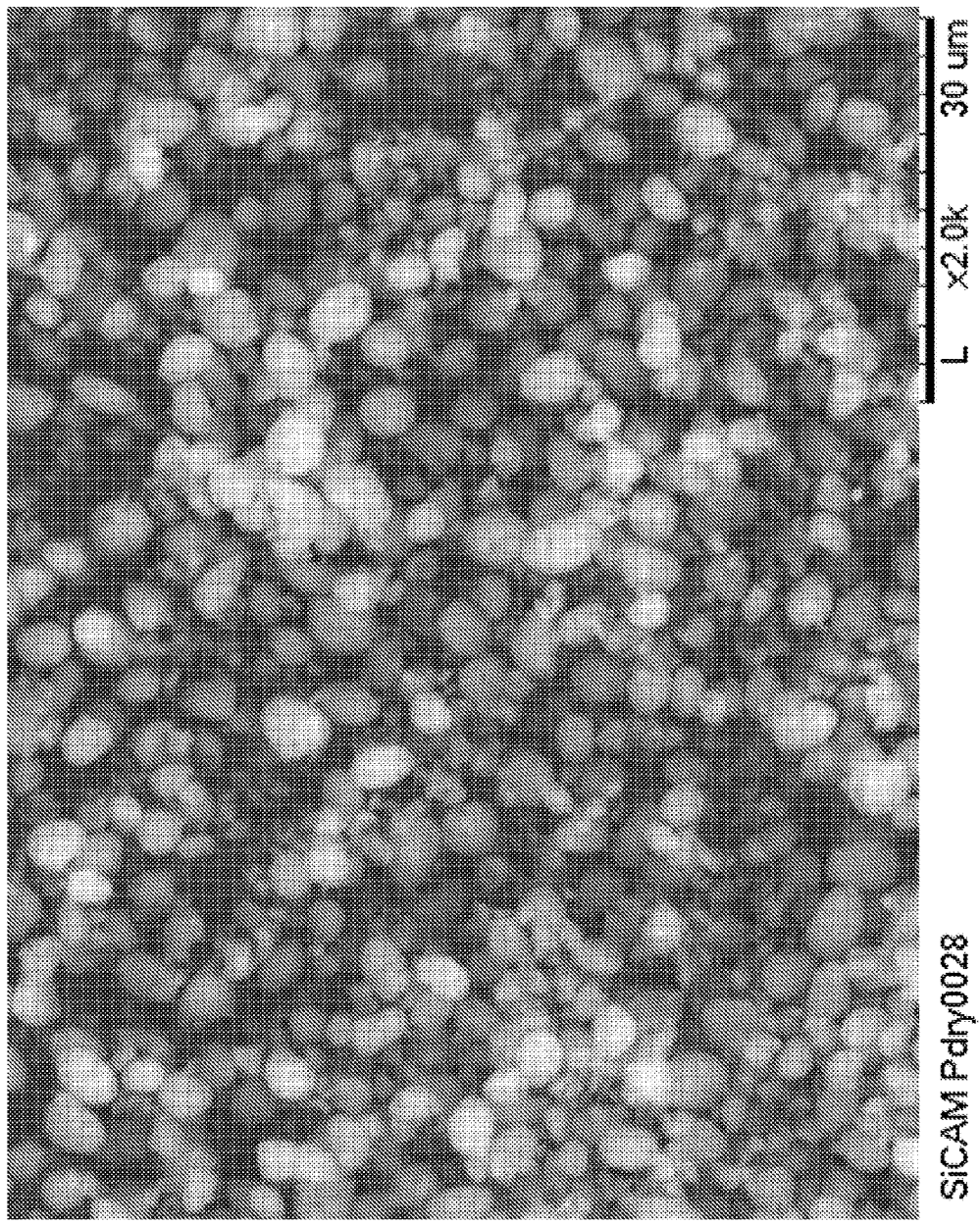
FIG. 1 is an SEM micrograph illustrating particles with spherical grains.

Applicants have discovered that the addition of a silica dopant into a colloidal alumina monohydrate (CAM) process resulted in improved properties of the resultant material. For example, the addition of the silica dopant resulted in a particulate material with increased specific surface area (SSA), pore volume (PV), pore size (PS), and mesoporosity (e.g., pores in the 10 nm to 50 nm range), among other improved characteristics.

As used herein, particles refer to individual units of the material that can be individually identified, such as in an SEM micrograph. The individual units typically represent the smallest subset of the material. In an embodiment, the particles can be combined to form an aggregate material. As used herein, aggregate refers to groups of particles adhered to one another. In certain forms, such as a green aggregate, the particles may be separated, such as by crushing. In other forms, such as after sintering the aggregate material, the particles of the aggregate material may not be readily separated but can remain individually identifiable within the aggregate material, such as in an SEM micrograph.

According to an embodiment, a particulate material is disclosed that includes an aluminous material and a silica dopant (i.e., "a silica doped aluminous particulate material"). In an embodiment, the aluminous material includes hydrated alumina, such as boehmite. In another embodiment, the aluminous material includes non-hydrated alumina, such as gamma alumina. In an embodiment, a ratio of the aluminous material to the silica dopant is greater than about 75:25 by weight, such as greater than about 85:15 by weight, greater than about 90:10 by weight, greater than about 91:9 by weight, greater than about 92:8 by weight, or greater than about 93:7 by weight. According to an embodiment, an average particle size of the silica dopant is less than about 20 nm, such as less than about 12 nm, less than about 10 nm, less than about 8 nm, or less than about 6 nm (i.e., "nano" silica). In an embodiment, the silica dopant is homogeneously distributed in the aluminous material.

The particulate material includes crystallite particles with a crystallite particle size of less than about 10 nm. The crystallite particles are stacked together to form primary particles with a primary particle size of less than about 500 nm. The primary particles are agglomerated together to form secondary particles with a secondary particle size of greater than about 1 µm. The particulate material has a mean pore diameter of not less than 8 nm.

It is understood that when reference is made herein to "particle sizes," these are volume average particle sizes measured using a particle size analyzer which employs a laser light scattering technique to measure the sizes. When running the particle size analyzer in "percent passing" mode, it is often convenient to describe the particle size distribution in terms of the volume percentage below a given level.

According to an embodiment, the primary particle size is in a range of about 100 nm to 500 nm, such as in a range of about 100 nm to about 400 nm, in a range of about 150 nm to about 300 nm, or in a range of about 150 nm to about 250 nm. According to an embodiment, the primary particles include rod-shaped particles. In an embodiment, the primary rod-shaped particles are agglomerated together to form secondary particles that form spherical grains. In an embodiment, the spherical grains have a mean diameter that is in a range of about 1.5 µm to about 8 µm, such as a range of about 2 µm to about 7 µm, a range of about 2 µm to about 6 µm, a range of about 2.5 µm to about 5.5 µm, or a range of about 3 µm to about 5 µm.

According to embodiments herein, the secondary particles may have a relatively narrow particle size distribution. In an embodiment, the secondary particle size of at least 80 percent of the secondary particles is in a range of about 1.5 µm to about 8 µm, such as a range of about 1.6 µm to about 7 µm, a range of about 1.7 µm to about 6 µm, a range of about 1.8 µm to about 5 µm, or a range of about 1.9 µm to about 4.6 µm. In an embodiment, the secondary particle size of at least 40 percent of the secondary particles is in a range of about 1.5 µm to about 5 µm, such as a range of about 1.6 µm to about 4.5 µm, a range of about 1.7 µm to about 4 µm, a range of about 1.8 µm to about 3.5 µm, or a range of about 1.9 µm to about 3.4 µm. In an embodiment, the secondary particle size of at least 40 percent of the secondary particles is in a range of about 2 µm to about 8 µm, such as a range of about 2.4 µm to about 7 µm, a range of about 2.5 µm to about 6 µm, a range of about 2.6 µm to about 5 µm, or a range of about 2.7 µm to about 4.6 µm.

Referring to FIG. 1, an SEM micrograph illustrates an exemplary embodiment of particulate material that includes secondary particles that form spherical grains. In the embodiment illustrated in FIG. 1, the spherical grains include substantially uniform spherical grains, with a median particle size in a range of about 3 µm to about 5 µm. An exemplary particle size distribution with a median particle size of 3.0342 µm is shown in Table 1.

TABLE 1

| Diameter on % | |
|---|---|
| 5.0% | 1.77 µm |
| 10.0% | 2.00 µm |
| 20.0% | 2.28 µm |
| 30.0% | 2.54 µm |
| 40.0% | 2.78 µm |
| 60.0% | 3.30 µm |
| 70.0% | 3.59 µm |
| 80.0% | 3.89 µm |
| 90.0% | 4.49 µm |
| 95.0% | 5.08 µm |

Applicants have discovered that substantially uniform spherical grains (e.g., with a median particle size in a range of about 3 to 5 microns) showed strong mechanical integrity. For example, the grains did not break up even under high shear treatment, e.g., in a Ross Mixer. In addition to the high surface area and high pore volume properties, this special morphology may make the particulate material of the present disclosure useful in various applications.

Figure 2:
FIG. 2a is a high resolution TEM micrograph illustrating particles with spherical grains.
FIG. 2b is a higher resolution TEM micrograph of a portion of the TEM micrograph of FIG. 2a, illustrating rod-shaped particles that are agglomerated together.
FIG. 2c is a higher resolution TEM micrograph of a portion of the TEM micrograph of FIG. 2b, illustrating the rod-shaped particles that are agglomerated together.

FIG. 2a is a high resolution TEM micrograph that illustrates particles with spherical grains (i.e., "secondary particles") as discussed above. FIG. 2b is a higher resolution TEM micrograph of a portion of the TEM micrograph of FIG. 2a that illustrates rod-shaped particles (i.e., "primary particles") that are agglomerated together to form the particles with spherical grains. According to an embodiment, the rod-shaped particles may have a primary aspect ratio of greater than about 2:1. In an embodiment, the rod-shaped particles have a secondary aspect ratio of less than about 2:1, such as about 1:1.

FIG. 2c is a higher resolution TEM micrograph of a portion of the TEM micrograph of FIG. 2b that illustrates the rod-shaped particles that are agglomerated together to form particles with spherical grains. The high resolution TEM image of FIG. 2c illustrates random packing of the rod-like boehmite crystals that may be associated with the improved surface area and pore volume in the embodiments described herein.

In an exemplary embodiment, the particulate material of the present disclosure may be formed by a process as described herein. The method includes providing a precursor material, seeds, and a silica dopant in a suspension and forming a particulate material that includes an aluminous material and the silica dopant. Forming the particulate material includes hydrothermal treating of the suspension.

According to an embodiment, the suspension includes an aqueous solution, such as an acidic solution that includes a mixture of deionized water and nitric acid. In an embodiment, the silica dopant is added to the acidic solution. In an embodiment, the seeds (e.g., boehmite) may be added to the acidic solution after the silica dopant is added. In an embodiment, the suspension is hydrothermally treated in an autoclave at a temperature greater than about 120° C., such as greater than about 125° C., greater than about 130° C., or greater than about 150° C. The temperature may be less than about 300° C., such as less than about 250° C. In an embodiment, the suspension is heat treated for a time period of greater than 1 hour, such as greater than 2 hours, or greater than 3 hours. The time period may be less than 24 hours. In an embodiment, the suspension is heat treated at a pressure that is autogenously generated.

In an embodiment, forming the particulate material further includes drying the suspension after hydrothermal treating of the suspension to form a dried gel, and crushing the dried gel. As an illustrative example, the suspension may be pan dried at 95° C. overnight. In an exemplary embodiment, the particulate material was calcined at a temperature of about 550° C. for 3 hours in order to determine surface area, pore volume, and pore diameter.

In an exemplary embodiment, after calcination, the silica doped aluminous particulate material has a specific surface area of not less than 150 m$^2$/g, such as not less than 200 m$^2$/g, not less than 210 m$^2$/g, not less than 220 m$^2$/g, not less than 230 m$^2$/g, or not less than 240 m$^2$/g. In an embodiment, the silica doped aluminous particulate material has a total pore volume of not less than 0.5 mL/g, such as not less than 1.0 mL/g, not less than 1.5 mL/g, not less than 1.8 mL/g, or not less than 2.0 mL/g. In an embodiment, the silica doped aluminous particulate material has a mean pore diameter that is not less than 9 nm, such as not less than 10 nm, not less than 11 nm, not less than 12 nm, not less than 13 nm, not less than 14 nm, or not less than 15 nm. In an embodiment, the mean pore diameter is less than 50 nm, such as less than 30 nm. In an embodiment, pores with a pore diameter between 10 nm and 50 nm provide at least 90% of a total pore volume of the particulate material.

EXAMPLES

Example 1

Particulate materials are prepared using a precursor, seeds and a silica dopant. The particulate material is dried and calcined. The samples are tested for SSA, pore volume, and pore size, and the results are shown in Table 2.

For example, Sample 1, a silica doped aluminous particulate material, is prepared as follows. A slurry is formed from boehmite seeds (Catapal B, available from SASOL), nano silica (SiO$_2$) dopant particles (Nalco2326, available from Nalco Chemical Co.) and alumina trihydroxide (ATH) (Hydral 710, available from Almatis). The slurry is hydrothermally treated at 192° C. for 1 hour. The slurry was pan dried at 95° C. overnight and calcined at 550° C. for 3 hours.

Sample 2 is prepared as Sample 1, except the nano silica dopant particles are NexSil20A, available from Nyacol.

TABLE 2

|  | SSA (m$^2$/g) | Pore Volume (mL/g) | Pore Size (nm) |
| --- | --- | --- | --- |
| Sample 1 | 247.7 | 1.113 | 16.0 |
| Sample 2 | 191.4 | 0.643 | 11.2 |

When an acidic colloidal silica with 20 nm particle size (Nexsil20A) was doped to the CAM, a moderate increase of surface area and pore volume were achieved but not as significantly as in the case of Nalco2326 (5 nm colloidal silica), indicating that the colloidal particle size as well as its pH may play roles, which are further discussed in the following sections.

Example 2

When colloidal silica with various particle sizes were employed as additives in the CAM synthesis, it was discovered that the surface area and pore volume of the silica doped CAM are linearly correlated with the silica particle size. Colloidal silica with smaller particle size lead to higher surface areas and larger pore volumes.

Particulate materials are prepared using a precursor, seeds and a silica dopant. The particulate material is dried and calcined. The samples are tested for SSA, pore volume, and pore size, and the results are shown in Table 3.

For example, Sample 2, a silica doped aluminous particulate material, is prepared as follows. A slurry is formed from boehmite seeds (Catapal B, available from SASOL), nano silica (SiO$_2$) dopant particles (NexSil5, available from Nyacol) and alumina trihydroxide (ATH) (Hydral 710, available from Almatis). The slurry is hydrothermally treated at 192° C. for 1 hour. The slurry was pan dried at 95° C. overnight and calcined at 550° C. for 3 hours.

Sample 2 is prepared as Sample 1, except the nano silica dopant particles are NexSil8, available from Nyacol.

Sample 3 is prepared as Sample 1, except the nano silica dopant particles are NexSil12, available from Nyacol.

Sample 4 is prepared as Sample 1, except the nano silica dopant particles are NexSil20, available from Nyacol.

TABLE 3

|  | SSA (m$^2$/g) | Pore Volume (mL/g) | Pore Size (nm) |
| --- | --- | --- | --- |
| Sample 1 | 210.5 | 0.912 | 13.7 |
| Sample 2 | 200.6 | 0.884 | 14.0 |
| Sample 3 | 190.5 | 0.831 | 14.3 |
| Sample 4 | 161.0 | 0.629 | 12.0 |

Example 3

Based on the experimental data presented above, Nalco2326 was selected for further testing. In order to determine the optimum silica doping levels, a series of experiments were designed and carried out by varying the silica dopant percentage from 1.5 to 10 percent.

Figure 3:
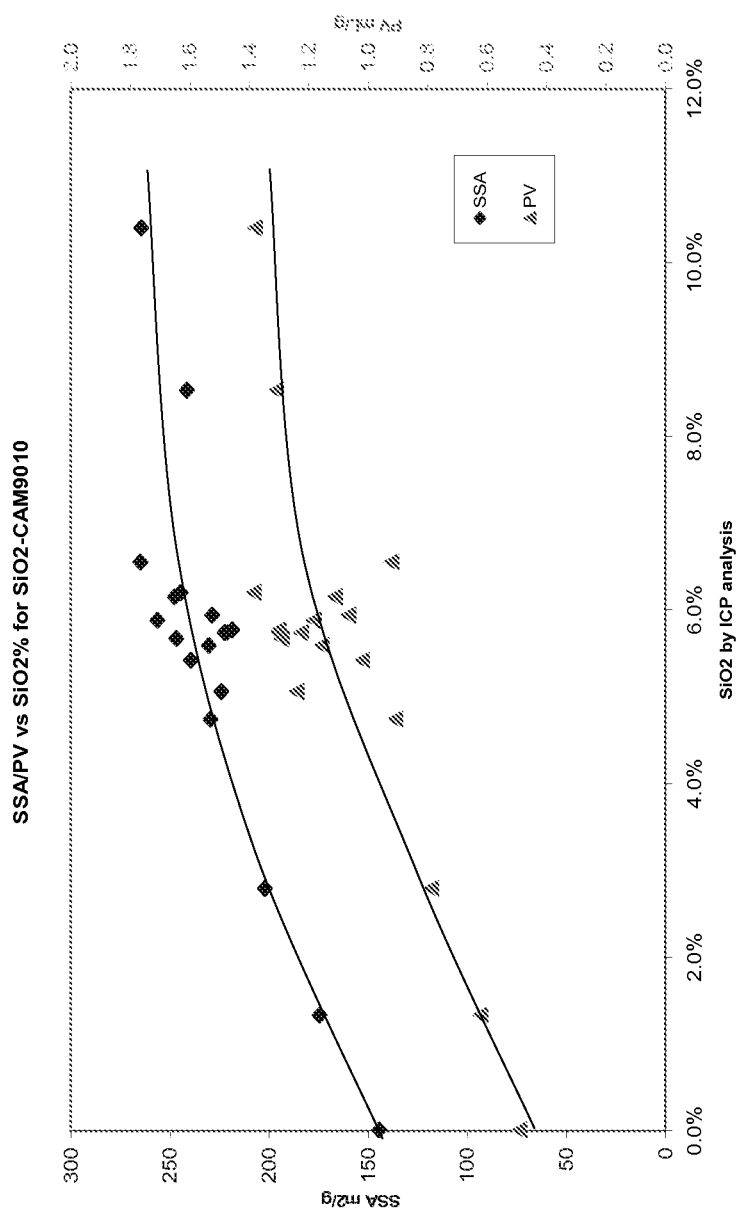
FIG. 3 is a graph illustrating the effects of silica dopant percentage on specific surface area (SSA) and pore volume (PV) according to an embodiment described herein.
Figure 4:
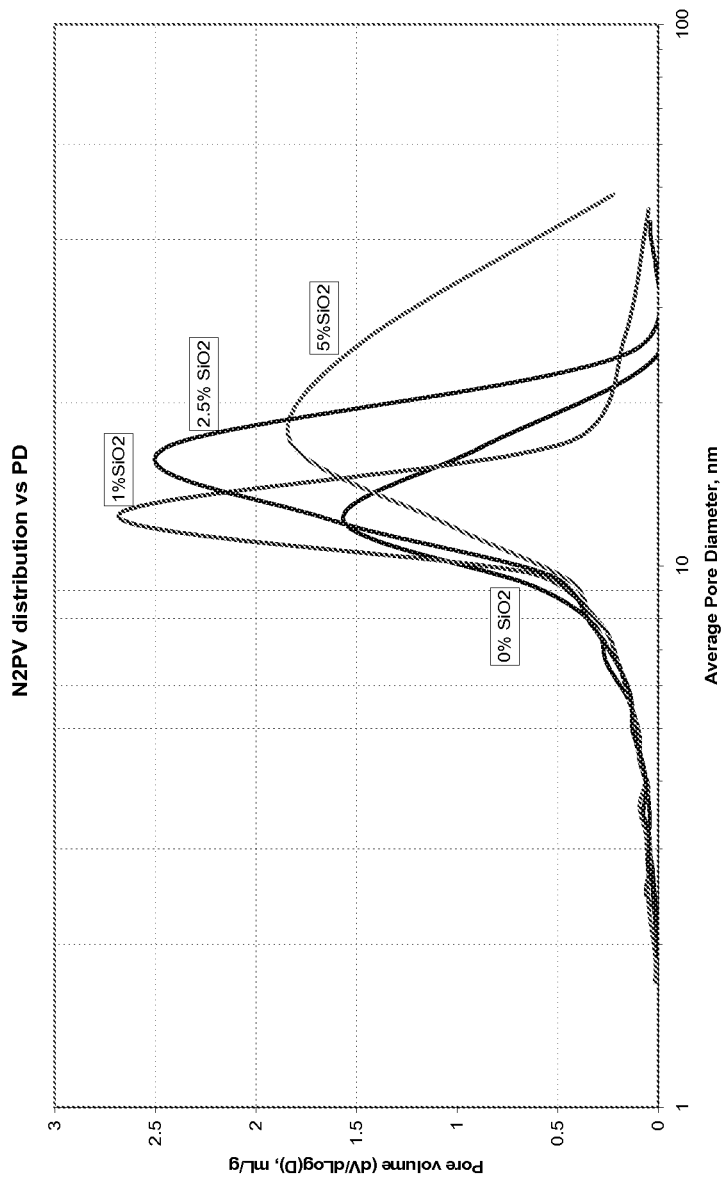
FIG. 4 is a graph illustrating the effects of silica dopant percentage on pore volume distributions according to an embodiment described herein.

As illustrated in FIG. 3, a linear correlation of surface area and pore volume with the silica loading up to 6 percent was observed, but the surface area and pore volume dependence on silica loading leveled off at a higher silica loading. Further, the levels of silica doping also have an effect on their pore size distribution. As illustrated in FIG. 4, the pore size distributions broadened and shifted to larger pores with increased silica loading.

As illustrative non-limiting examples, the particulate material of the present disclosure may be included in a catalyst carrier, a high pressure liquid chromatography (HPLC) column, or a polymer filler, among other alternatives. Another possible application for high surface area, high pore volume boehmite is the filler as absorbent on top layer coatings on ink jet papers.

In HPLC column applications, thermal and hydrothermal resistance may make the HPLC column media more durable. HPLC columns typically use silica (e.g., 5 micron silica) or polymer microspheres as fixed phase that serve as media to partition (separate) mixtures (so called chromatography). High surface area, high pore volume, and large pore size are highly desired properties for the media to partition mixtures with high efficiency. Further, the spheres used in HPLC columns need to be strong to withstand the high pressure. As such, the particulate material of the present disclosure with its spherical particle shape and size, high surface area, high pore volume and pore size, and strength may be useful in HPLC column applications.

In catalyst carrier applications, catalysts may be exposed to high temperatures, hydrothermal and acidic environments. Boehmite is widely used as the raw material for forming shaped alumina carriers for a wide range of catalysts, such as hydrotreating (refinery), Fischer-Tropsch reactions, etc. The particulate material of the present disclosure may provide high surface area and high pore volume to a formed carrier. These properties can help to increase active phase loading and their dispersion on the catalyst, and large pores improve mass transfer efficiency of reactants and products on catalyst. The thermal and hydrothermal stability, as well as acid resistance of the particulate material of the present disclosure are highly desired properties for the catalyst carriers where the catalysts are exposed to high temperature, hydrothermal, and acidic environments, in order to prevent deactivation of the catalyst and to extend the life of the catalyst.

In polymer filler applications, the high aspect ratios of the primary particles of the particulate material of the present disclosure may enhance the mechanical strength of polymer or tire materials. The secondary particles of the particulate material may be broken up by milling to its primary particles for this purpose. However, the secondary particle size and shape may be directly used as fillers because the high surface area, pore volume, and large pore sizes would allow the polymer and rubber to penetrate into the secondary particles to integrate the particles into the polymer/rubber. In this application, the particulate material is to be used without calcination, and the boehmite may also serve as a fire retardant because it would dehydrate and absorb heat when it is exposed to fire.

According to an embodiment, the particulate material of the present disclosure was calcined at a temperature of about 650° C. for 3 hours in order to evaluate hydrothermal stability. In an embodiment, the particulate material of the present disclosure has a Hydrothermal Stability Index of not more than 25 percent, such as not more than 20 percent, or not more than 15 percent. In this case, the Hydrothermal Stability Index represents a change in a specific surface area of the particulate material after performing a hydrothermal heat treatment at a temperature of about 220° C. for a time period of 16 hours. According to another embodiment, the particulate material has a Hydrothermal Stability Index of not more than 5 percent, such as not more than 2 percent, or not more than 1.5 percent. In this case, the Hydrothermal Stability Index represents a change in a pore volume of the particulate material after performing a hydrothermal heat treatment at a temperature of about 220° C. for a time period of 16 hours. According to another embodiment, the particulate material has a Hydrothermal Stability Index of not more than 5 percent, such as not more than 2 percent, or not more than 1.5 percent. In this case, the Hydrothermal Stability Index represents a change in the mean pore diameter after performing a hydrothermal heat treatment at a temperature of about 220° C. for a time period of 16 hours.

According to an embodiment, the particulate material of the present disclosure was calcined at a temperature of about 650° C. for 3 hours in order to evaluate acid resistance. In an embodiment, the particulate material has an Acid Resistance Index of less than 15 ppm/m$^2$. In this case, the Acid Resistance Index may represent alumina that is dissolved after performing an acid treatment on the particulate material at a pH of about 2 for 25 hours. According to another embodiment, the particulate material has an Acid Resistance Index of less than 0.5 ppm/m$^2$. In this case, the Acid Resistance Index represents silica that is dissolved after performing an acid treatment on the particulate material at a pH of about 2 for 25 hours.

While the invention has been illustrated and described in the context of specific embodiments, it is not intended to be limited to the details shown, since various modifications and substitutions can be made without departing in any way from the scope of the present invention. For example, additional or equivalent substitutes can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims.

What is claimed is:

1. A particulate material comprising:
    an aluminous material; and
    a silica dopant in an amount of 1.5 wt % to 10 wt % based on the total weight of the particulate material,
    wherein the particulate material includes crystallite particles with a crystallite particle size of less than about 10 nm, wherein the crystallite particles are stacked together to form primary particles with a primary particle size of less than about 500 nm, wherein the primary particles are agglomerated together to form secondary particles with a secondary particle size from about 1 µm to about 8 µm, and wherein the particulate material has a mean pore diameter of not less than 8 nm and a total pore volume of not less than 0.5 ml/g.

2. The particulate material of claim 1, wherein the primary particles include rod-shaped particles.

3. The particulate material of claim 2, wherein the rod-shaped particles have a primary aspect ratio of greater than about 2:1.

4. The particulate material of claim 1, wherein the aluminous material comprises hydrated alumina.

5. The particulate material of claim 1, wherein the aluminous material comprises non-hydrated alumina.

6. The particulate material of claim 1, wherein an average particle size of the silica dopant is less than about 20 nm.

7. The particulate material of claim 1, wherein a ratio of the aluminous material to the silica dopant is greater than about 93:7 by weight.

8. The particulate material of claim 1, wherein the particulate material has a Hydrothermal Stability Index of not more than 25 percent, wherein the Hydrothermal Stability Index represents a change in a specific surface area of the particulate material after calcining at a temperature of about 650° C. for a time period of 3 hours and performing a hydrothermal heat treatment at a temperature of about 220° C. for a time period of 16 hours.

9. The particulate material of claim 1, wherein the particulate material has an Acid Resistance Index of less than 15 ppm/m$^2$, wherein the Acid Resistance Index represents alumina that is dissolved after calcining at a temperature of about 650° C. for a time period of 3 hours and performing an acid treatment on the particulate material at a pH of about 2 for 25 hours.

10. A method comprising:
    providing a precursor material, seeds, and a silica dopant in a suspension; and
    forming a particulate material that includes an aluminous material and the silica dopant, the silica dopant being present in an amount of 1.5 wt % to 10 wt % based on the total weight of the particulate material,
    wherein forming the particulate material includes hydrothermal treating of the suspension, wherein the particulate material includes crystallite particles with a crystallite particle size of less than about 10 nm, wherein the crystallite particles are stacked together to form primary particles with a primary particle size of less than about 500 nm, and wherein the primary particles are agglomerated together to form secondary particles with a secondary particle size from about 1 µm to about 8 µm, and wherein the particulate material has a mean pore diameter of not less than 8 nm and a total pore volume of not less than 0.5 ml/g.

11. The method of claim 10, wherein forming the particulate material further comprises:
   drying the suspension after heat treating the suspension to form a dried gel; and
   crushing the dried gel.

12. The method of claim 10, wherein the aluminous material comprises boehmite.

13. The method of claim 10, wherein the aluminous material comprises gamma alumina.

14. The particulate material of claim 6, wherein an average particle size of the silica dopant is less than about 12 nm.

15. The particulate material of claim 1, wherein the particulate material has a specific surface area of not less than 150 m$^2$/g.

16. The particulate material of claim 1, wherein at least 90% of a total pore volume of the particulate material is between 10 nm and 50 nm.

17. The particulate material of claim 4, wherein the hydrated alumina comprises boehmite.

18. The particulate material of claim 5, wherein the non-hydrated alumina comprises gamma alumina.

19. The particulate material of claim 2, wherein the rod-shaped particles are arranged in form of spherical grains.

* * * * *